United States Patent [19]
Williams

[11] 4,060,400
[45] Nov. 29, 1977

[54] REFRIGERATED SEMITRAILER TRUCK FOR LONG AND LOCAL DELIVERIES

[75] Inventor: David Roth Williams, Dallas, Tex.

[73] Assignee: Henry L. Franke

[21] Appl. No.: 606,836

[22] Filed: Aug. 22, 1975

[51] Int. Cl.² ............................................. F25D 29/00
[52] U.S. Cl. ........................................ 62/162; 62/239; 62/332; 62/514 R
[58] Field of Search .................... 62/45, 239, 240, 332, 62/161, 162, 514 R

[56] References Cited
U.S. PATENT DOCUMENTS

| | | | |
|---|---|---|---|
| 2,479,840 | 8/1949 | Johnson et al. | 62/514 R X |
| 3,127,755 | 4/1964 | Hemery | 62/514 R X |
| 3,269,133 | 8/1966 | Dixon | 62/514 R X |
| 3,287,925 | 11/1966 | Kane et al. | 62/514 R X |
| 3,447,334 | 6/1969 | Kimball | 62/64 |
| 3,507,128 | 4/1970 | Murphy et al. | 62/332 X |

*Primary Examiner*—Ronald C. Capossela
*Attorney, Agent, or Firm*—Hubbard, Thurman, Turner & Tucker

[57] ABSTRACT

A refrigerated semitrailer truck for both long and local delivery of frozen foods in a hot environment is disclosed which utilizes both a liquid nitrogen unit and a mechanical refrigeration unit with an automatic control system. The system automatically turns the liquid nitrogen off when the temperature is above 30° F., below −10° F., or when an access door to the insulated truck is open. The liquid nitrogen also operates as a standby unit at all temperatures above −10° F. in the event of a malfunction of the mechanical unit.

6 Claims, 4 Drawing Figures

REFRIGERATED SEMITRAILER TRUCK FOR LONG AND LOCAL DELIVERIES

This invention relates generally to refrigerated trucks for transporting frozen food products, and more particularly relates to a semitrailer truck suitable for delivering a large load over substantial distances and then off-loading portions of the total load to a succession of relatively close retail outlets which utilizes an automated system having both a mechanical compression-expansion type refrigerating unit and a cryogenic refrigerating unit.

In order to transport frozen food substantial distances economically, it is necessary to transport any product in a large semitrailer in order to reduce the labor and fuel cost associated with the product. It has been customary to transport frozen food products in refrigerated trucks for substantial distances which sometimes required overnight stops. In such cases, it is generally the practice to deliver the entire load of the refrigerated truck to a single destination. In order to effectively market frozen products such as prepared meats and foods for fast food chains, the prepared foods must be transported substantial distances from the manufacturing plant. It would be highly desirable to transport the frozen product over a substantial distance and then make a series of local deliveries direct from the transporting truck to retail or other customers of only a portion of the relatively large load. This creates a significant problem for the capacity of the conventional compression-expansion type refrigeration units because at each stop the doors of the refrigerated trailer are open for a considerable period of time, sometimes as much as thirty minutes, while a portion of the load is off-loaded. A load of frozen foods has the capacity to absorb considerable heat before the product is softened sufficiently to adversely affect its sale value so that the first stop or so is not significant because the conventional mechanical refrigeration unit can usually handle the refrigeration requirements to maintain the product in good frozen condition. However, where multiple stops are made, particularly in very hot weather, the repeated opening of the door to the trailer often results in a significant degradation of the frozen products as a result of frost on the packages from humidity condensation and softness of the frozen product.

The present invention is concerned with a delivery truck having an automated refrigeration system which includes both the conventional mechanical refrigeration unit and a cryogenic refrigeration unit such as one using liquid nitrogen. In particular, the system provides for the primary operation of the mechanical unit during the initial in-transit phase and during the first off-loading stop with the cryogenic unit operating as a standby unit. As soon as all doors are closed after the first off-loading stop, the mechanical unit first lowers the temperature to a point where the mechanical unit becomes inefficient, then the cryogenic unit is automatically enabled to rapidly cool the interior of the chamber to the desired sub-zero temperature, a temperature which is slightly above that at which the mechanical refrigeration unit can normally maintain until the compartment is again opened. However, if the mechanical unit is not adequate, the cryogenic unit is automatically operated intermittently to maintain the desired low temperature. At the next stop the potential use of the cryogenic unit is disabled by opening of the door for safety reasons and the mechanical unit continues to operate during off-loading. Upon closing of the doors, the cryogenic unit is again automatically operated at the temperature where the mechanical unit becomes inefficient. In the event of a failure of the mechanical unit, the cryogenic unit is automatically operated at all temperatures above the low temperature at which it is desired to maintain the frozen food compartment. In the event any access door to the refrigeration compartment is opened, the cryogenic unit is immediately disabled because the gas, usually nitrogen, is dangerous to personnel who might enter the chamber. The system also provides for the automatic venting of the pressure which would build up as a result of vaporization of the cryogenic gas.

The present invention further contemplates specific embodiments of the system for accomplishing the automated features set forth above.

The novel features believed characteristic of this invention are set forth in the appended claims. The invention itself, however, as well as other objects and advantages thereof, may best be understood by reference to the following detailed description of illustrative embodiments, when read in conjunction with the accompanying drawings, wherein:

Figure 1:
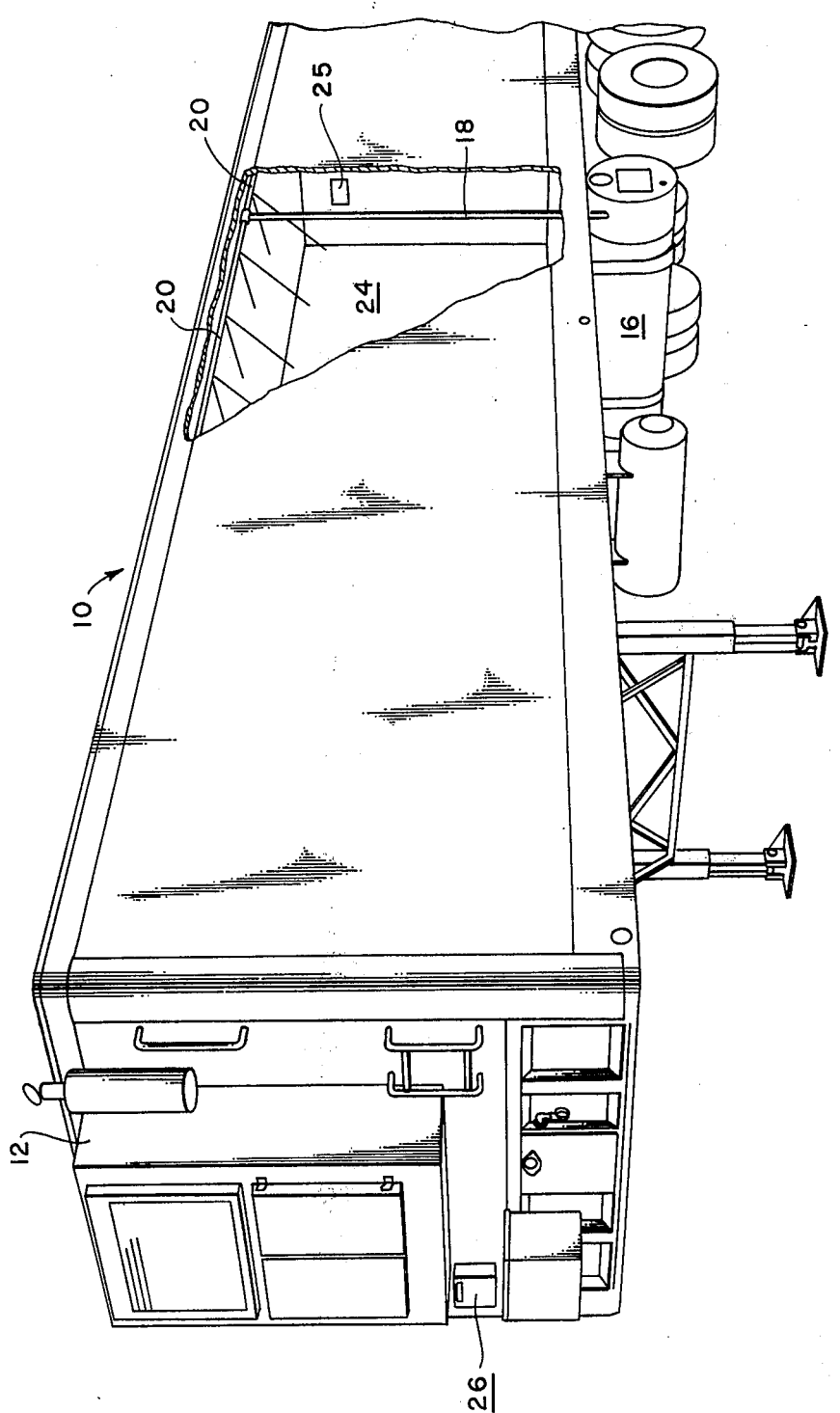
FIG. 1 is a perspective view, partially broken away, of a frozen food delivery semitrailer in accordance with the present invention.

Referring now to the drawings, a delivery semitrailer in accordance with this invention is generally designated by the reference numeral 10 in FIG. 1. The truck has an insulated storage chamber 24, a conventional mechanical refrigeration unit 12, and a liquified nitrogen refrigeration unit indicated generally by the reference numeral 14. As will be noted in FIGS. 1 and 2, the liquid nitrogen unit 14 includes a liquified gas container 16 for storing liquid nitrogen, and a conduit 18 which directs liquified nitrogen from the storage tank 16 to headers 20 disposed along the top of the chamber 24 and having spray nozzles 22 for spraying the liquid nitrogen into the storage chamber 24. The chamber 24 is provided with a pressure relief valve 25 in one of the rear doors to prevent a dangerous pressure buildup in the relatively airtight chamber.

Figure 2:
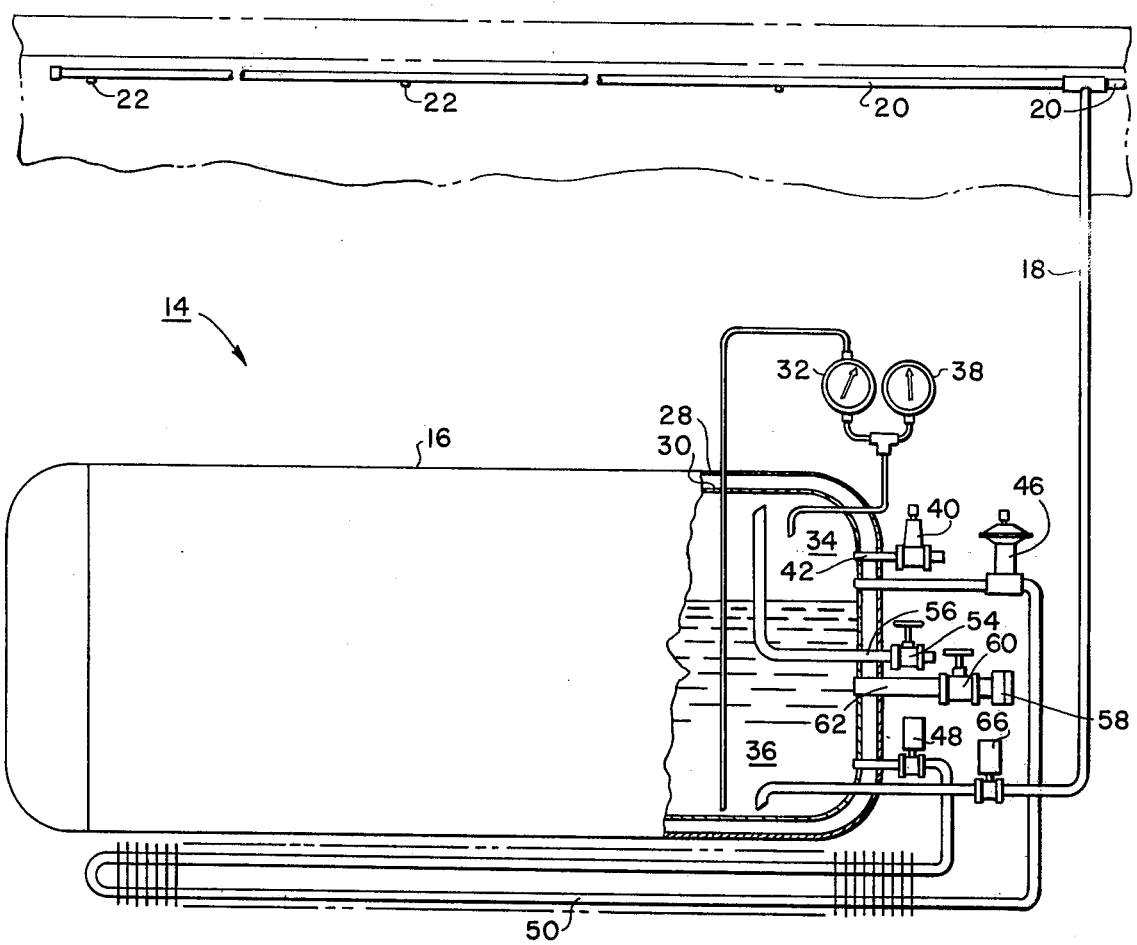
FIG. 2 is a diagrammatic illustration of the liquified nitrogen unit of the delivery semitrailer of FIG. 1.

The liquified nitrogen unit is illustrated in greater detail in FIG. 2 where the storage tank 16 is partially broken away to reveal a double-walled structure having an outer wall 28 and an inner wall 30. A liquid level gauge 32 measures the pressure differential between the gas phase portion 34 of the tank and the bottom of the liquid phase portion 36 of the tank to determine the liquid level in the tank. A pressure gauge 38 measures the pressure in the gas phase portion 34 of the tank 16. A pressure relief valve 40 communicates with the gas phase portion 34 of the tank. A finned evaporator tube 50 is connected between the gas phase portion 34 and the liquid phase portion 36 and includes a pressure regulator 46 and a solenoid operated valve 48 to provide pressure in the tank for driving the liquid nitrogen from the tank when needed as will presently be described. A manually operated vent valve 54 is connected via a vent pipe 56 to the gas phase portion 34 of the tank to allow manual venting of the tank contents. A connector 58, a valve 60 and pipe 62 provide a means for filling the tank with liquid nitrogen. Liquid passing to the spray headers 20 by a spray conduit 18 is controlled by a solenoid operated valve 66. When solenoid operated valve 66 is open, liquid gas will be forced by the gas pressure in the tank through conduit 18 and headers 20 to the spray nozzles 22. Solenoid valves 48 and 66 are both opened whenever liquid nitrogen is to be supplied to the chamber 24.

Figure 3:
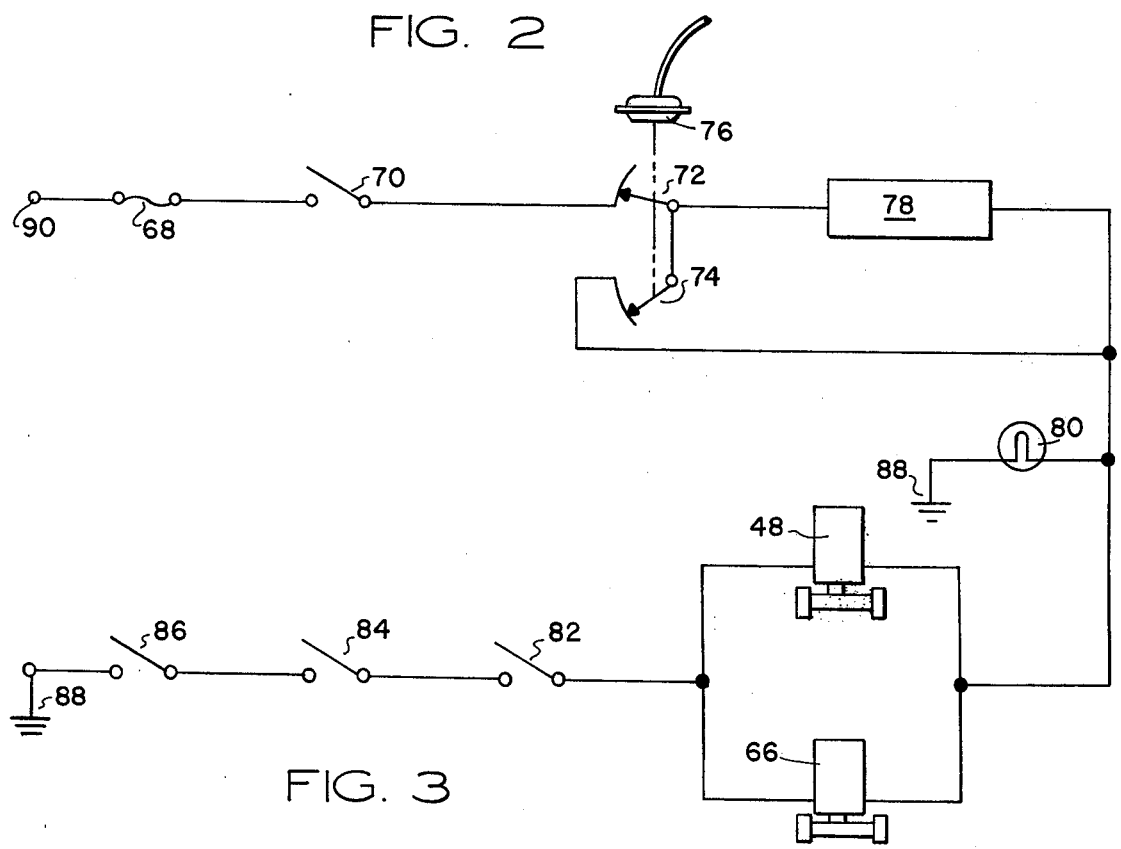
FIG. 3 is a schematic circuit diagram of the control system for the liquid nitrogen unit and the mechanical refrigeration unit of the delivery semitrailer of FIG. 1.
Figure 4:
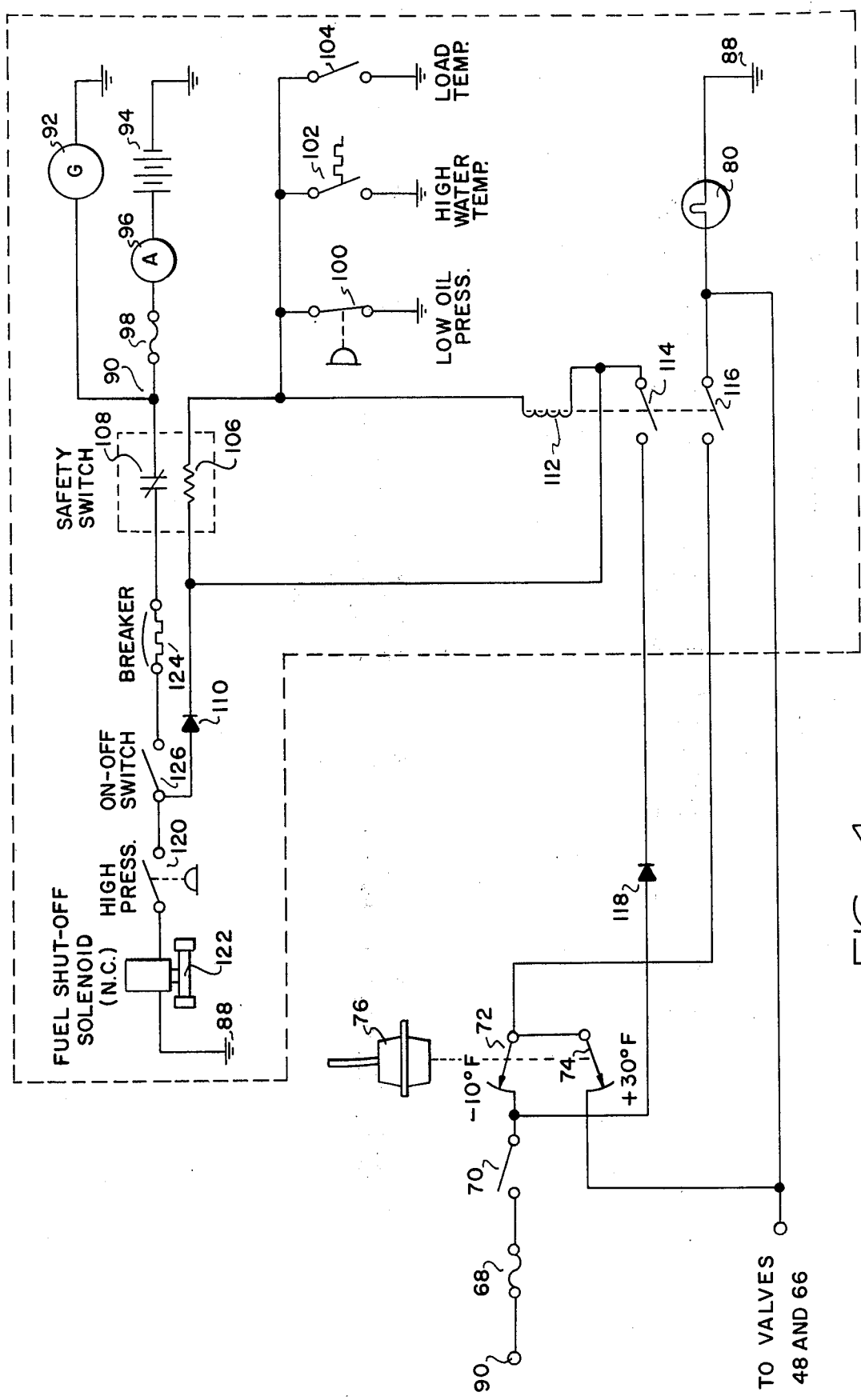
FIG. 4 is a detailed schematic circuit diagram of a portion of the circuit diagram of FIG. 3.

The control circuit for the liquified nitrogen refrigeration unit and the mechanical unit is illustrated in FIGS. 3 and 4. The control circuit includes a fuse 68, a manually operated main switch 70, a thermostatically controlled switch 72 controlled by thermostat 76, a sensor circuit 78 (which is illustrated in detail in FIG. 4) to detect failure of the mechanical refrigeration unit, all of which are connected in series. A light 80 to indicate that the liquified gas system is either operating or ready to operate is connected in parallel with two solenoid valves 48 and 66, a side door switch 82 which is closed only when the side door of the trailer unit is closed, two rear door switches 84 and 86 which are closed only when both rear doors of the trailer are closed. This circuit is connected across a twelve volt D.C. power source, typically the battery for the mechanical refrigeration unit 12, as represented by terminal 90 and the system ground which is represented by symbol 88. A second switch 74 is controlled by the thermostat 76 and is connected to shunt detector circuit 78 for purposes which will be hereafter described in greater detail.

The thermostatically controlled switch 74 opens whenever the temperature in the refrigerated storage chamber 24 rises above the temperature at which the efficiency of the mechanical unit diminishes rapidly, typically about +30° F. Switch 72 opens whenever the temperature falls below the temperature at which the product is safe but above the temperature at which the thermostat of the mechanical unit is set to hold the temperature. For example, the switch 72 would be set to open at −10° F. while the mechanical unit might be set to hold the temperature of the chamber at −15° F. or less.

The portion of the circuit within box 78 of FIG. 3 is illustrated in greater detail in FIG. 4, which also illustrates some components shown in FIG. 3, these components being designated by the same reference numerals. A generator 92, battery 94, amp meter 96 and fuse 98 are typically those provided for the mechanical refrigeration unit 12. Safety switch 108, circuit breaker 124, manual on-off switch 126, high pressure safety switch 120, which is operated by excessive refrigerant pressure, and a solenoid operated fuel shutoff valve 122 are connected in series across the battery 94. The fuel shutoff valve 122 controls the internal combustion engine for the mechanical refrigeration unit 12.

Three failure mode switches 100, 102, and 104 are connected to draw current through heating element 106 of safety switch 108 when closed, and when the unit is in operation as a result of manual on-off switch 126 being closed. Switch 100 is normally closed and is held open by adequate oil pressure in the internal combustion engine of unit 12. Switch 102 is normally open a closes when the temperature of the coolant for the internal combustion engine exceeds a safe limit, and switch 104 is normally open and closes when a temperature probe buried in the frozen load exceeds a level such as to indicate that the refrigeration unit has become inoperative. In the event of closure of any one of switches 100, 102, and 104, current is drawn through heating element 106 which after a short time delay opens switch 108, deenergizing the fuel shutoff solenoid 122 to stop flow of fuel to the internal combustion engine, thus shutting the mechanical system of the mechanical refrigeration unit down. However, before switch 108 opens, current passes through diode 110 and the coil of relay 112 through the failure mode switch that is closed. This pulls relay 112 in to close switch 114 completing a holding circuit for the relay coil 112 through switch 70 from the power terminal 90, which may be the positive terminal of battery 94. When relay 112 is energized, switch 116 is also closed to bypass high temperature switch 74 of the thermostatically controlled pair of switches 72 and 74, so that the nitrogen refrigeration unit will continue operation above +30° F. when the mechanical refrigeration unit has become inoperative. The light 80 is operated by current through switches 72 and 74 to ground, or in the alternative, through switches 72 and 116 to ground. Similarly, the valves 48 and 66 of FIG. 3 and operated by current through either of the paths which illuminate light 80 to operate the liquid nitrogen refrigeration unit whenever the three switches 82, 84 and 86 are closed by closure of the three doors of the unit.

In the operation of the trailer 10, the on-off switch 126 is closed to open the fuel valve 122 to the internal combustion engine of the mechanical refrigeration unit 12. Simultaneously, the internal combustion engine of unit 12 is started so that oil pressure will open the low oil pressure switch 100. The switch 104 is responsive to a probe which is placed in the frozen load so that it is opened. The mechanical unit 12 will then cool the chamber 24 adequately and efficiently to maintain the frozen load at the desired temperature for normal transit. The manual switch 70 is customarily closed at the time loading of the trailer is complete, the doors closed, and the transit temperature reached by the mechanical unit in order to conserve expensive nitrogen.

When the delivery truck reaches its destination, at least one of the doors are opened, typically for as much as thirty minutes, while portions of the load are removed from the truck, thus disabling the cryogenic unit by opening one of the switches 82, 84 or 86. Then the doors are closed and the truck driven for a short period of time to a next store where the doors are again opened and deliveries made. If the temperature is above +30° F., the nitrogen system remains inoperative because switch 74 is open so that the circuit from terminal 90 through switch 72 and 74 to the valves 48 and 46 is broken, even though the door switches 82, 84 and 86 may be closed. Relay 112 is deenergized so long as the mechanical unit is operating properly so that switch 116 remains open. The mechanical refrigeration unit 12 is highly efficient when the ambient temperature in the chamber 24 is above +30° F. and is effective to fairly rapidly cool the ambient down to +30° F. so that use of the expensive nitrogen is not warranted. At about +30° F., thermostat 76 closes switch 74 so that solenoids 48 and 66 are energized. As a result, liquid nitrogen passes through the valves of solenoid 48 into the evaporator 50 where the hot exterior air generates a pressure as a result of liquid nitrogen evaporating from the liquid phase portion 36, which pressure passes through regulator 46 to the tank to force liquid nitrogen through the open solenoid valve 66 to the header 20 and out the spray nozzles 22. As soon as the liquid nitrogen enters the chamber 24, it flashes to very rapidly continue to cool the interior of the chamber 24 until the temperature is below −10° F., at which time thermostatically controlled switch 72 opens, thus closing solenoid valves 48 and 66. The mechanical refrigeration unit 12 is then set to maintain the temperature below −10° F. until the next stop so that nitrogen will normally not be consumed. In this manner, the liquid nitrogen is consumed at the most efficient rate while rapidly cooling the interior of the chamber 24 to prevent softening of the frozen foods of the remaining load. As a result, frequent off-loading stops for portions of the frozen food load can be made without adversely affecting the quality of the frozen food.

The nitrogen refrigeration unit 14 also functions as a standby unit in the event of a malfunction of the mechanical refrigeration unit 12. Referring to FIG. 4, if the internal combustion engine of the unit 12 should stop for any reason, such as a result of a high pressure switch 120 opening due to high refrigerant pressure, then a circuit would be completed through resistive heating element 106 and through relay 112 and oil pressure switch 100 to ground. This immediately closes switches 114 and 116. Switch 114 functions as a holding circuit for the relay coil 112 until such time as the engine is restarted to open oil pressure switch 100. Switch 116 bypasses the high temperature switch 74 so that the liquid nitrogen refrigeration unit 14 functions even at temperatures above +30° F. The same result occurs should one of the switches 100, 102 or 104 close as a result of low oil pressure, high water temperature, or high temperature from the probe in the frozen load, respectively. In any case, current flows through heating element 106 and through the coil of relay 112 as previously described. The heating element 106 then opens switch 108 which deenergizes solenoid 122, shutting down the internal combustion engine of the unit 12. As soon as the internal combustion engine of the mechanical refrigeration unit is shutdown, low oil pressure switch 100 closes to ensure that the holding circuit for relay 112 remains closed even though the water temperature switch 112 or the switch 104 should ultimately open as a result of the water temperature cooling or the load being frozen by the liquid nitrogen system.

Although preferred embodiments of the invention have been described in detail, it is to be understood that various changes, substitutions and alterations can be made therein without departing from the spirit and scope of the invention as defined by the appended claims.

What is claimed is:

1. A vehicle for transporting a substantial load of frozen foods over a substantial distance and then off-loading portions of the load at each of a number of relatively closely spaced destinations which comprises:
   a vehicle having an insulated load carrying compartment having at least one access door;
   a mechanical refrigeration unit for refrigerating the compartment by means of a compression-expansion refrigeration cycle;
   a cryogenic refrigeration unit for introducing liquified gas into the compartment when enabled by a manual switch of a control system and not disabled by the control system; and
   a control system including
   a. manual means for manually enabling operation of the control system,
   b. high temperature means for automatically disabling the cryogenic refrigeration unit in response to the temperature of the air space in the compartment rising above a predetermined maximum value,
   c. detection means for disabling the high temperature means to permit operation of the cryogenic refrigeration unit in response to a failure of the compression-expansion refrigerator unit to maintain the temperature of the air space in the chamber at or below the predetermined maximum value,
   d. low temperature means for disabling the cryogenic refrigeration unit in response to the temperature of the air space compartment falling below a predetermined minimum value, and
   e. door detection means for automatically disabling the cryogenic refrigeration unit when an access door to the compartment is opened.

2. A vehicle for transporting a substantial load of frozen foods over a substantial distance and then off-loading portions of the load at each of a number of relatively closely spaced destinations which comprises:
   a vehicle having an insulated load carrying compartment having at least one access door;
   a mechanical refrigeration unit for refrigerating the compartment by means of a compression-expansion refrigeration cycle;
   a cryogenic refrigeration unit for introducing liquified gas into the compartment when enabled by a manual switch of a control system and not disabled by the control system; and
   a control system including
   a. manual means for manually enabling operation of the cryogenic refrigeration unit,
   b. high temperature means for automatically disabling the cryogenic refrigeration unit in response to the temperature of the air space in the compartment rising above a predetermined maximum value,
   c. low temperature means for disabling the cryogenic refrigeration unit in response to the temperature of the air space compartment falling below a predetermined minimum value, and
   d. door detection means for automatically disabling the cryogenic refrigeration unit when an access door to the compartment is opened.

3. A vehicle for transporting a substantial load of frozen foods over a substantial distance and then off-loading portions of the load at each of a number of relatively closely spaced destinations which comprises:
   a vehicle having an insulated load carrying compartment having at least one access door;
   a mechanical refrigeration unit for refrigerating the compartment by means of a compression-expansion refrigeration cycle;
   a cryogenic refrigeration unit for introducing liquified gas into the compartment when enabled by a manual switch of a control system and not disabled by the control system; and
   a control system including
   a. manual means for manually enabling operation of the cryogenic refrigeration unit,
   b. low temperature means for disabling the cryogenic refrigeration unit in response to the temperature of the air space compartment falling below a predetermined minimum value, and c. door detection means for automatically disabling the cryogenic refrigeration unit when an access door to the compartment is opened.

4. A vehicle for transporting a substantial load of frozen foods over a substantial distance and then off-loading portions of the load at each of a number of relatively closely spaced distinations which comprises:
a vehicle including a semitrailer having an insulated load carrying compartment having at least one access door;
a mechanical refrigeration unit for refrigerating the compartment by means of a compression-expansion refrigeration cycle, said refrigerating unit including an internal combustion engine which drives a compressor;
a cryogenic refrigeration unit for introducing liquified gas into the compartment when enabled by a manual switch of a control system and not disabled by the control system; and
a control system including
  a. manual means for manually enabling operation of a cryogenic refrigeration unit,
  b. high temperature means for automatically disabling the cryogenic refrigeration unit in response to the temperature of the air space in the compartment rising above a predetermined maximum value,
  c. detection means for disabling the high temperature means in response to a failure of the compression-expansion refrigerator unit to maintain operation of the cryogenic refrigeration unit when the air space in the chamber is above the predetermined maximum value, including means responsive to termination of operation of the internal combustion engine,
  d. low temperature means for disabling the cryogenic refrigeration unit in response to the temperature of the air space compartment falling below a predetermined minimum value, and
  e. door detection means for automatically disabling the cryogenic refrigeration unit when an access door to the compartment is opened.

5. A vehicle for transporting a substantial load of frozen foods over a substantial distance and then off-loading portions of the load at each of a number of relatively closely spaced destinations which comprises:
a vehicle having an insulated load carrying compartment having at least one access door;
a mechanical refrigeration unit for refrigerating the compartment by means of a compression-expansion refrigeration cycle;
a cryogenic refrigeration unit for introducing liquified gas into the compartment when enabled by a manual switch of a control system and not disabled by the control system; and
a control system including
  a manual means for manually enabling operation of the cryogenic refrigeration unit, and
  b. low temperature means for disabling the cryogenic refrigeration unit in response to the temperature of the air space compartment falling below a predetermined minimum value.

6. A vehicle for transporting a substantial load of frozen foods over a substantial distance and then off-loading portions of the load at each of a number of relatively closely spaced destinations which comprises:
a vehicle having an insulated load carrying compartment having at least one access door;
a mechanical refrigeration unit for refrigerating the compartment by means of a compression-expansion refrigeration cycle;
a cryogenic refrigeration unit for introducing liquified gas into the compartment when enabled by a manual switch of a control system and not disabled by the control system; and
a control system including
  a manual means for manually enabling operation of the control system,
  b. means for automatically enabling operation of the cryogenic refrigeration unit in response to detecting a failure of the compression-expansion refrigeration unit, and
  c. low temperature means for disabling the cryogenic refrigeration unit in response to the temperature of the air space compartment falling below a predetermined minimum value.

* * * * *